(12) United States Patent
Ma et al.

(10) Patent No.: US 11,411,479 B2
(45) Date of Patent: Aug. 9, 2022

(54) LINEAR VIBRATION MOTOR WITH BUFFER BLOCKS

(71) Applicant: LANTO ELECTRONIC LIMITED, Jiangsu (CN)

(72) Inventors: Bingbing Ma, Kunshan (CN); Yifeng Zhang, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 395 days.

(21) Appl. No.: 16/611,958

(22) PCT Filed: Nov. 15, 2018

(86) PCT No.: PCT/CN2018/115717
§ 371 (c)(1),
(2) Date: Nov. 8, 2019

(87) PCT Pub. No.: WO2020/052054
PCT Pub. Date: Mar. 19, 2020

(65) Prior Publication Data
US 2020/0389077 A1 Dec. 10, 2020

(30) Foreign Application Priority Data

Sep. 13, 2018 (CN) .......................... 201811067187.1

(51) Int. Cl.
*H02K 33/02* (2006.01)
*B06B 1/04* (2006.01)
*H02K 33/18* (2006.01)

(52) U.S. Cl.
CPC ............. *H02K 33/02* (2013.01); *H02K 33/18* (2013.01); *B06B 1/045* (2013.01)

(58) Field of Classification Search
CPC ........ H02K 33/18; H02K 33/12; H02K 33/16; H02K 1/34; H02K 33/02; H02K 7/04; B06B 1/045
See application file for complete search history.

(56) References Cited

U.S. PATENT DOCUMENTS 6,105,943 A * 8/2000 Nagasawa ............. F16F 13/264
267/140.14
6,700,230 B1 * 3/2004 Gokturk ................. H02K 33/16
310/13

(Continued)

FOREIGN PATENT DOCUMENTS

CN 106160401 A 11/2016
CN 206341115 U 7/2017

(Continued)

OTHER PUBLICATIONS

Chen (CN 206524745 U) English Translation (Year: 2017).*

(Continued)

*Primary Examiner* — Burton S Mullins
*Assistant Examiner* — Robert E Mates
(74) *Attorney, Agent, or Firm* — Birch, Stewart, Kolasch & Birch, LLP

(57) ABSTRACT

Disclosed is a linear vibration motor including a housing, a vibrator assembly, and a driving assembly. The housing is provided with a circuit board. The vibration assembly is disposed in the housing. A through hole is defined in the vibration assembly along the thickness of the housing. The driving assembly is disposed in the through hole and fixedly connected to the housing. The driving assembly includes an iron core and a coil. The iron core includes an intermediate shaft extending along the length of the housing and two end blocks disposed at two ends of the intermediate shaft. The cross-sectional area of the intermediate shaft is smaller than the cross-sectional area of each of the two end blocks. The (Continued)

coil is sleeved on the intermediate shaft and connected to the circuit board. An external circuit is operative to transmit a driving current signal to the coil through the circuit board, so that the driving assembly can drive the vibrator assembly to perform a reciprocating motion along the length of the housing.

17 Claims, 4 Drawing Sheets

(56) References Cited

U.S. PATENT DOCUMENTS

| | | | | |
|---|---|---|---|---|
| 2003/0127918 A1* | 7/2003 | Fukunaga | ............... | H02K 33/16 |
| | | | | 310/36 |
| 2005/0104456 A1* | 5/2005 | Yajima | ................... | H02K 33/16 |
| | | | | 310/12.25 |
| 2011/0062803 A1* | 3/2011 | Lee | ........................ | H02K 33/18 |
| | | | | 310/29 |
| 2014/0202252 A1* | 7/2014 | Umehara | ................. | H02K 1/34 |
| | | | | 73/664 |
| 2017/0056927 A1* | 3/2017 | Chun | ....................... | B06B 1/045 |
| 2018/0241293 A1* | 8/2018 | Miyazaki | ................ | B06B 1/045 |

FOREIGN PATENT DOCUMENTS

| | | | |
|---|---|---|---|
| CN | 206524745 U | * | 9/2017 |
| CN | 206602446 U | | 10/2017 |
| CN | 206835365 U | | 1/2018 |

OTHER PUBLICATIONS

Chinese Office Action and Search Report dated Aug. 30, 2019 for Application No. 201811067187.1 with an English translation.
Extended European Search Report dated Jul. 29, 2021 for Application No. 18933618.3.

* cited by examiner

LINEAR VIBRATION MOTOR WITH BUFFER BLOCKS

CROSS REFERENCE TO RELATED APPLICATIONS

This application is the National Phase of PCT/CN2018/115717 filed on Nov. 15, 2018, which claims priority under 35 U.S.C. § 119(a) to Patent Application No. 201811067187.1 filed in China on Sep. 13, 2018, all of which are hereby expressly incorporated by reference into the present application.

TECHNICAL FIELD

The present disclosure relates to the technical field of vibration motors, for example, relates to a linear vibration motor.

BACKGROUND

With the development of electronic technology and the popularization of portable consumer electronic products, common smart phones, smart watches, handheld game consoles, and game handles all use a vibration motor as feedback of a system operation. For example, with the popularization of full-screen and keyless smart phones, a vibration motor is typically used as feedback of system operations in order to achieve better feedback experience.

In a related horizontal (along the width and length of a portable device, differing from the height) linear vibration motor, the motor is driven with a structure in which pure coils and permanent magnets are vertically arranged. And to provide better vibration performance, more permanent magnets and coils are typically accommodated so as to provide a driving power for the linear vibration motor. However, the linear vibration motor improved in such way may have the following problems accompanying the improvement of the performance.

First, a bigger volume of the linear vibration motor. To accommodate more permanent magnets and coils, the volume of the linear vibration motor must be increased. The increase of the volume of the linear vibration motor may take up more valuable space within the terminal product, such that more care needs to be taken on the structural arrangement of the terminal product and the space for other assemblies needs to be reduced. This hinders the popularization of linear vibration motors.

Second, a more complex structure of the linear vibration motor. With the increase of permanent magnets and the coils, the total parts in the linear vibration motor are also increased in number, leading to a more complex structure of the linear vibration motor.

Third, more manufacturing processes, thereby increasing the risks regarding reliability. The complexity of the structure increases the manufacturing processes of the product as well the risks regarding reliability.

Fourth, a higher manufacturing cost. The complex structure, the increase in the number of parts, and the increase in manufacturing processes all add additional costs to the product from raw materials all the way to the processes, resulting in a corresponding increase in cost accompanying the improvement of the performance.

SUMMARY

The present disclosure provides a linear vibration motor which is simple in structure, safe and reliable while the vibration performance is improved.

In one embodiment, the disclosed embodiment provides a linear vibration motor. The linear vibration motor includes a housing, a vibrator assembly and a driving assembly. The housing is provided with a circuit board. The vibrator assembly is disposed in the housing and provided with a through hole running along the thickness of the housing. The driving assembly is disposed in the through hole and fixedly connected to the housing. The driving assembly includes an iron core and a coil, where the iron core includes an intermediate shaft extending along the length of the housing and two end blocks disposed at two ends of the intermediate shaft. The cross-sectional area of the intermediate shaft is less than that of each of the two end blocks. The coil is sleeved on the intermediate shaft and is connected to the circuit board. The driving assembly is operative to drive the vibrator assembly to perform a reciprocating motion along the length of the housing.

In one embodiment, the vibrator assembly further includes: a mass, where the through hole is defined in the mass; two permanent magnets, extending along the length of the housing, clamped in the through hole, and arranged on two sides of the driving assembly in a width of the housing; and two elastic members, fixedly connected to two ends of the mass along the length of the housing.

In one embodiment, each permanent magnet is divided into three sections of magnetization structures along the length of the housing, and a magnetization gap is provided between two adjacent sections of magnetization structures.

In one embodiment, every two adjacent sections of magnetization structures on each of the two permanent magnets have opposite magnetic poles.

In one embodiment, the magnetization structures of the two permanent magnets are oppositely disposed, and the magnetic poles of each pair of oppositely disposed magnetization structures are repulsive.

In one embodiment, two end blocks of the iron core are arranged corresponding to the two magnetization gaps defined in each of the two permanent magnets.

In one embodiment, when the coil is not energized, two sides of the vibrator assembly are equally spaced from two inner walls of the housing along the width of the housing, and two sides of the iron core are equally spaced from two side walls of the through hole along the width of the housing.

In one embodiment, along the width of the housing a distance between the vibrator assembly and the inner wall of the housing is smaller than a distance between the iron core and the side wall of the through hole.

In one embodiment, when the coil is not energized, two sides of the vibrator assembly are equally spaced from two inner walls of the housing along the length of the housing, and two sides of the iron core are equally spaced from two side walls of the through hole along the length of the housing.

In one embodiment, the elastic deformation amount of each of the two elastic members along the length of the housing is smaller than the distance between the iron core and the side wall of the through hole along the length of the housing.

In one embodiment, a magnetic conductive plate is further interposed between each of the permanent magnets and a sidewall of the through hole that is adjacent to the permanent magnet and that extends along the length of the housing.

In one embodiment, a buffer block is interposed between each of two ends of the driving assembly along the length of the housing and a corresponding one of two side walls of the through hole along the width of the housing.

In one embodiment, a magnetic fluid is filled between the vibrator assembly and the driving assembly.

In one embodiment, the housing includes a bottom plate and a cover. The bottom plate and the cover enclose a receiving cavity, and the vibrator assembly and the driving assembly are disposed in the receiving cavity. A notch is defined in an edge of the cover connected to the bottom plate, and the bottom plate extends outwards from the notch to form a fixing table, and the circuit board is mounted on the fixing table.

Figure 1:
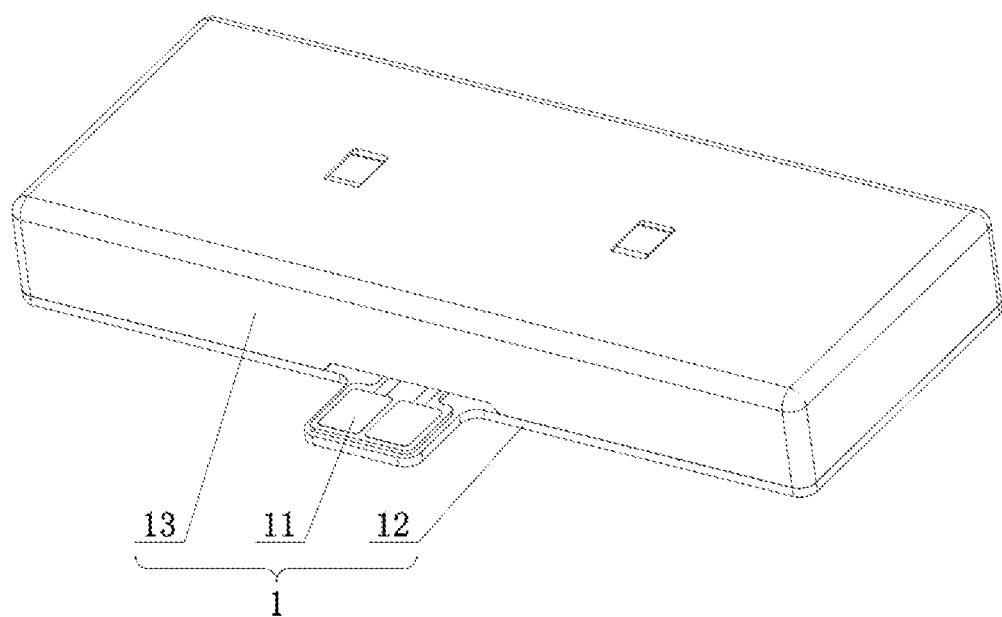
FIG. 1 is a schematic diagram of a linear vibration motor according to an embodiment of the present disclosure.
Figure 2:
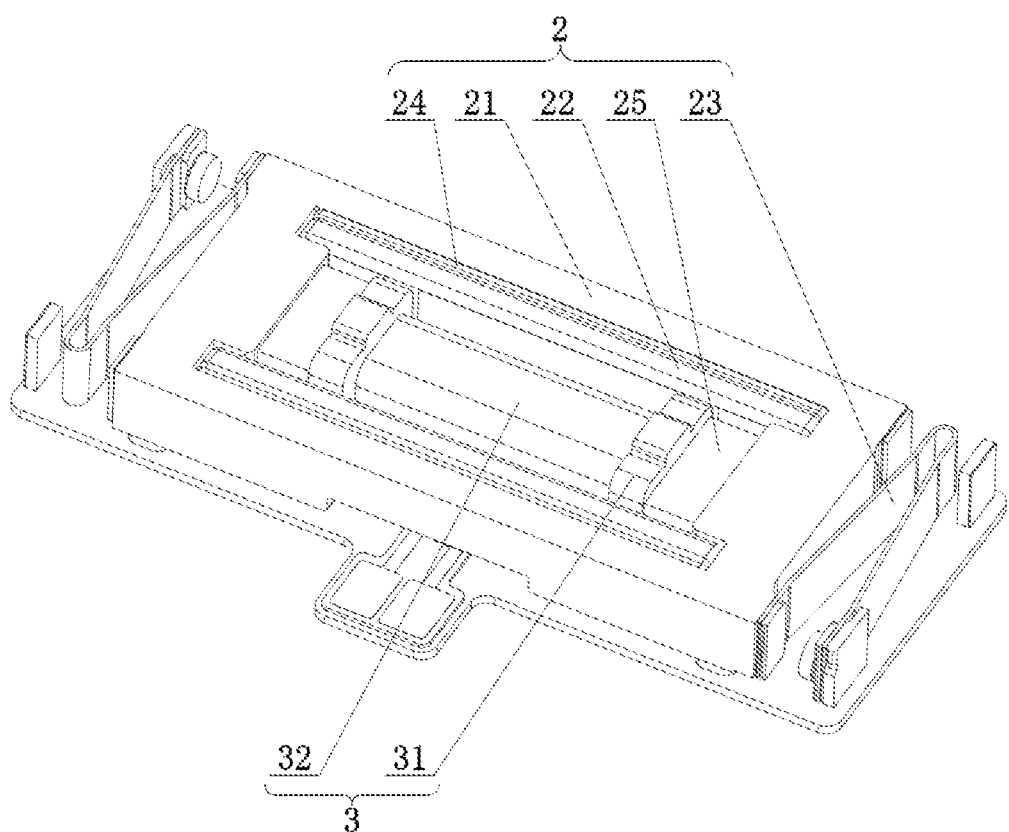
FIG. 2 is a schematic diagram of a linear vibration motor without a cover according to an embodiment of the present disclosure.
Figure 3:
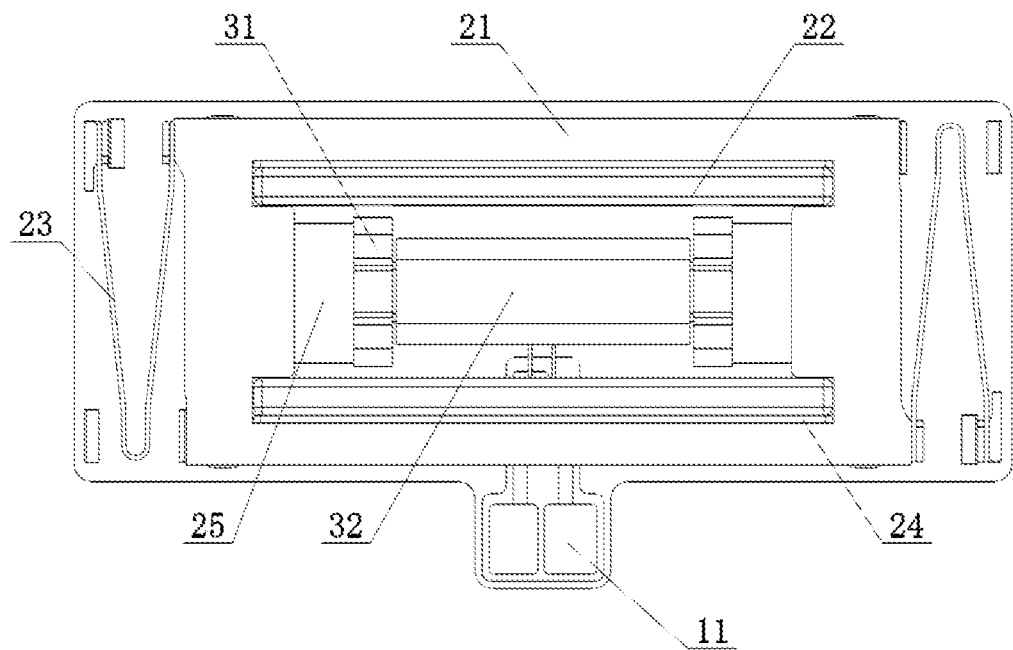
FIG. 3 is a top view of FIG. 2.
Figure 4:
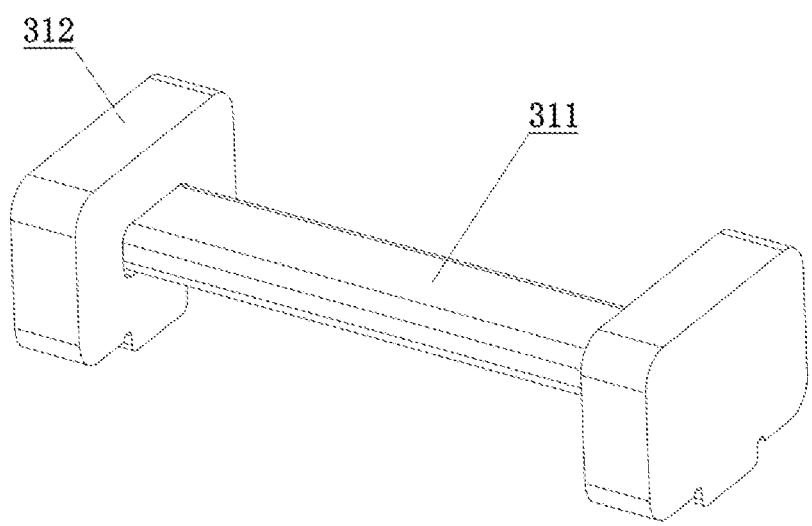
FIG. 4 is a schematic diagram of an iron core according to an embodiment of the present disclosure.

In the drawings:
1. Housing; 11. Circuit board; 12. Bottom plate; 13. Cover;
2. Vibrator assembly; 21. Mass; 22. Permanent magnet; 221. Magnetization structure; 222. Magnetization gap; 23. Elastic member; 24. Magnetic conductive plate; 25. Buffer block;
3. Driving assembly; 31. Iron core; 311. Intermediate shaft; 312. End block; 32. Coil

DETAILED DESCRIPTION

Embodiments in accordance with the present disclosure will be described in detail below. Examples of the embodiments are illustrated in the drawings, where the same or similar reference numerals indicate the same or similar elements or elements having the same or similar functions. The embodiments described below with reference to the drawings are exemplary, intended to explain the present disclosure, and not to be construed as limiting the present disclosure.

The solutions of the present disclosure are described hereinafter through specific embodiments in conjunction with the accompanying drawings.

As illustrated in FIGS. 1 to 5, the present disclosure provides a linear vibration motor including a housing 1, a vibrator assembly 2, and a driving assembly 3. The vibrator assembly 2 is disposed in the housing 1. The vibrator assembly 2 is disposed in the housing 1. A through hole is defined in the housing 1 along the thickness of the housing 1. The driving assembly 3 is disposed in the through hole and fixedly connected to the housing 1. The driving assembly 3 includes an iron core 31 and a coil 32. The iron core 31 includes an intermediate shaft 311 extending along the length of the housing 1 and two end blocks 312 disposed at two ends of the intermediate shaft 311. The cross-sectional area of the intermediate shaft 311 is smaller than the cross-sectional area of each of the two end blocks 312. The coil 32 is sleeved on the intermediate shaft 311 and connected to the circuit board 11. The external circuit is operative to transmit a driving current signal to the coil 32 through the circuit board 11, so that the driving assembly 3 is operative to drive the vibrator assembly 2 to perform a reciprocating motion along the length of the housing 1.

In the present disclosure, the iron core 31 is additionally disposed in the coil 32, the magnetic field intensity generated after the coil 32 is energized is improved, so that the vibration performance of the linear vibration motor is improved. The through hole is defined in the vibrator assembly 2, and the driving assembly 3 is disposed in the through hole, so that the thickness of the linear vibration motor is effectively reduced, a simple structure is ensured, and the safety and reliability are achieved. The I-shaped iron core 31 composed of the intermediate shaft 311 and the end block 312 enables the magnetic field intensity provided by the driving assembly 3 to be stronger. The protection of the I-shaped iron core 31 on the coil 32 is more reliable in structure, avoiding the collision between the coil 32 and the vibrator assembly 2. The iron core 31 and the coil 32 extend along the length of the housing 1, so that the effective utilization length of the coil 32 is larger, and the vibration performance of the linear vibration motor is further improved.

In the present disclosure, the iron core 31 is made of a magnetic conductive material, and may be integrally formed (using techniques such as Computer Numerical Control (CNC)/Metal Injection Molding (MIM)), may be formed from a plurality of parts that are assembled together, or may be formed from silicon steel sheets that are stacked and riveted together.

In the present embodiment, the vibrator assembly 2 includes a mass 21, two permanent magnets 22, and two elastic members 23. The through hole is defined in the mass 21. The two permanent magnets 22 extend along the length of the housing 1, clamped in the through hole and arranged on two sides of the driving assembly 3 along the width of the housing 1. Each of two elastic members 23 are fixedly connected to a corresponding one of the two ends of the mass block 21 along the length of the housing 1, and is connected to the housing 1. In one embodiment, the elastic member 23 is a member having elasticity, such as a V-shaped spring or a C-shaped spring; and when elastic deformation occurs, the elastic member 23 is provided with spacers at a position where the elastic member 23 collides within itself, a position where the elastic member 23 collides with the mass 21, and a position where the elastic member 23 collides with the housing 1.

Figure 5:
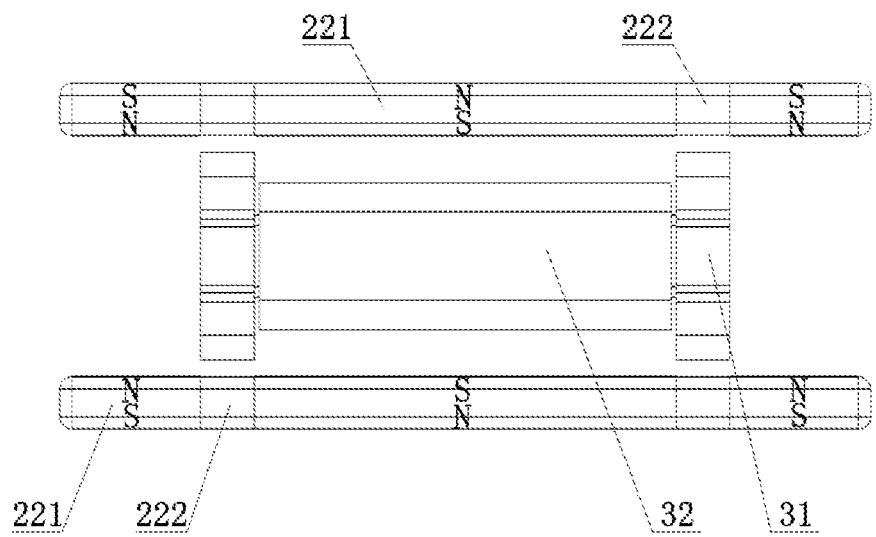
FIG. 5 is a schematic diagram illustrating a driving assembly fitted with permanent magnets marked with magnetic poles according to an embodiment of the present disclosure.

In one embodiment, as illustrated in FIG. 5 (N and S represent magnetic poles, where the N pole represents the north pole, and the S pole represents the south pole), the permanent magnet 22 is divided into three sections of magnetization structures 221 along the length of the housing 1. A magnetization gap 222 is provided between two adjacent sections of magnetization structures 221. The magnetic poles of two adjacent sections of magnetization structures 221 on each permanent magnet 22 are repulsive. The magnetization structures 221 of two permanent magnets 22 are oppositely disposed. The magnetic poles of each pair of oppositely disposed magnetization structures 221 are repulsive (that is, the magnetic poles of two magnetization structures 221 opposite on two permanent magnets 22 are repulsive), and two end blocks 312 of the iron core 31 are respectively disposed opposite to the two magnetization gaps 222 on the permanent magnet 22 (that is, the two end blocks 312 of the iron core 31 are respectively opposite to the two magnetization gaps 222 on the permanent magnet 22). This arrangement makes the distribution of magnetic field more reasonable, thereby improving the driving efficiency of the driving assembly 3 and obtaining a stronger drive power.

In the present embodiment, when the coil 32 is not energized, two sides of the vibrator assembly 2 are equally spaced from two inner walls of the housing 1 along the width of the housing 1, and the two sides of the iron core 31 are equally spaced from the two side walls of the through hole along the width of the housing 1. In one embodiment, a distance between the vibrator assembly 2 and the inner wall of the housing 1 is smaller than a distance between the iron core 31 and the side wall of the through hole in a width of the housing 1. In one embodiment, when the coil 32 is not energized, two sides of the vibrator assembly 2 are equally spaced from two inner walls of the housing 1 along the length of the housing 1, and the two sides of the iron core 31 are equally spaced from the two side walls of the through hole along the length of the housing 1. In one embodiment, the elastic deformation amount of the elastic member 23 along the length of the housing 1 is smaller than the distance between the iron core 31 and the side wall of the through hole along the length of the housing 1. This arrangement effectively prevents the iron core 31 from colliding with the vibrator assembly 2, thereby improving the operation reliability of the linear vibration motor.

In one embodiment, the mass 21 may be made from a non-magnetic conductor or a magnetic conductor. When the mass 21 is made of a non-magnetic material, a magnetic conductive plate 24 may be interposed between the permanent magnet 22 and the side wall of the through hole to reinforce the magnetic field of the working surface of the permanent magnet 22. When the mass 21 is made of a magnetic conductive material, the magnetic conductive plate 24 can be omitted, and the mass 21 is used for reinforcing the magnetic field of the working surface of the permanent magnet 22. Under the condition that the magnetic conductive plate 24 is disposed, magnetic conductive plate 24, permanent magnet 22, driving assembly 3, permanent magnet 22 and magnetic conductive plate 24 are sequentially distributed in the through hole along the width of the housing 1. In the present embodiment, the magnetic conductive plate 24 is made of a strong magnetic conductive metal, and generally, Japanese Stainless Steel (SUS) 430 is used to gather the magnetic field so as to enhance the magnetic field strength of the permanent magnet 22 on the side (working surface) close to the iron core 31, thereby improving the driving efficiency and effectively reducing the side leakage flux of the motor.

In one embodiment, the buffer blocks 25 are interposed between the two ends of the driving assembly 3 along the length of the housing 1 and two side walls of the through hole along the width of the housing 1, so that the system damping is increased and the frequency band range of the frequency response is widened. Meanwhile, the resonant frequency of the motor system can be changed, so that the purpose of adjusting the resonant frequency of the system can be achieved by slightly changing the same product, thereby meeting more customer requirements. In this embodiment, the buffer block 25 may be disposed to fill the gap between the mass 21 and the iron core 31, or may be attached to the mass 21 on a single side or attached to the iron core 31 on a single side or fixed on the housing 1 with a certain distance from the iron core 31 and the mass 21. The material of the buffer block 25 may be foam, plastic, or glue, the shape may be square, circular, or any other shape, and the fixing process may be a manner of double-sided adhesive bonding, dispensing fixing, or embedding in the mass block 21 or the iron core 31.

In one embodiment, a magnetic fluid is filled between the vibrator assembly 2 and the driving assembly 3 to increase system damping, which can improve system stability.

In the present embodiment, the housing 1 includes a bottom plate 12 and a cover 13. The bottom plate 12 and the cover 13 form a receiving cavity, and the vibrator assembly 2 and the driving assembly 3 are disposed in the receiving cavity. A notch is defined in an edge of the cover 13 connected to the bottom plate 12. The bottom plate 12 extends outwards from the gap to form a fixing table, and the circuit board 11 is mounted on the fixing table. This arrangement enables a simple structure and facilitates easy mounting and dismounting. With this arrangement, the circuit board 11 (in one embodiment, the circuit board 11 is a flexible circuit board) is reliably mounted and is securely connected to the coil 32. In one embodiment, the bottom plate 12 and the cover 13 are made from a magnetic conductive material (in this embodiment, SUS430 is used), so that the leakage flux of the motor can be effectively reduced, thereby avowing the magnetic interference of the motor with a terminal product.

In the present disclosure, the cover 13 may be integrally formed by press molding, or may be formed from two L-shaped frames and a flat plate that are assembled together.

In the present disclosure, the iron core 31 may be fixed to to the housing 1. In particular, the upper side and the lower side of the iron core 31 may be fixed to the bottom plate 12 and the cover 13 of the housing 1 in various manners. For example, both the upper side and the lower side are welded; both the upper side and the lower side are riveted; one side is welded and the other side is riveted; one side is welded and the other side is fixedly freely; one side is riveted and the other side is fixedly freely; or both sides are secured in other manners.

What is claimed is:
1. A linear vibration motor, comprising:
a housing (1), provided with a circuit board (11);
a vibrator assembly (2), disposed in the housing (1), wherein the vibrator assembly (2) is provided with a through hole running along a thickness of the housing (1); and
a driving assembly (3), disposed in the through hole and fixedly connected to the housing (1), wherein the driving assembly (3) comprises an iron core (31) and a coil (32), the iron core (31) comprises an intermediate shaft (311) extending along a length of the housing (1) and two end blocks (312) disposed at two ends of the intermediate shaft (311), wherein the intermediate shaft (311) has a cross-sectional area that is less than a cross-sectional area of each of the two end blocks (312), the coil (32) is sleeved on the intermediate shaft (311) and connected to the circuit board (11), wherein the driving assembly (3) is operative to drive the vibrator assembly (2) to perform a reciprocating motion along the length of the housing (1);
wherein the vibrator assembly (2) comprises: a mass (21), wherein the through hole is defined in the mass (21); two permanent magnets (22), extending along the length of the housing (1) and clamped in the through hole, and arranged on two sides of the driving assembly (3) in a width of the housing (1); and two elastic members (23), fixedly connected to two ends of the mass (21) in the length of the housing (1);

wherein each of the two permanent magnets (22) is divided into three sections of magnetization structures (221) along the length of the housing (1), and a magnetization gap (222) is provided between every two adjacent sections of magnetization structures (221);

wherein the two end blocks (312) of the iron core (31) are spaced apart and aligned with the two magnetization gaps defined in each of the two permanent magnets (22).

2. The linear vibration motor of claim 1, wherein every two adjacent sections of magnetization structures (221) on each of the two permanent magnets (22) have opposite magnetic poles.

3. The linear vibration motor of claim 2, wherein the magnetization structures (221) of the two permanent magnets (22) are disposed opposite to each other, and magnetic poles of each pair of oppositely disposed magnetization structures (221) are repulsive.

4. The linear vibration motor of claim 2, wherein the housing (1) comprises a bottom plate (12) and a cover (13);
wherein the bottom plate (12) and the cover (13) enclose a receiving cavity, and the vibrator assembly (2) and the driving assembly (3) are disposed in the receiving cavity; and
a notch is defined in an edge of the cover (13) connected to the bottom plate (12), and the bottom plate (12) extends outwards from the notch to form a fixing table, and the circuit board (11) is mounted on the fixing table.

5. The linear vibration motor of claim 1, wherein the magnetization structures (221) of the two permanent magnets (22) are disposed opposite to each other, and magnetic poles of each pair of oppositely disposed magnetization structures (221) are repulsive.

6. The linear vibration motor of claim 5, wherein the housing (1) comprises a bottom plate (12) and a cover (13);
wherein the bottom plate (12) and the cover (13) enclose a receiving cavity, and the vibrator assembly (2) and the driving assembly (3) are disposed in the receiving cavity; and
a notch is defined in an edge of the cover (13) connected to the bottom plate (12), and the bottom plate (12) extends outwards from the notch to form a fixing table, and the circuit board (11) is mounted on the fixing table.

7. The linear vibration motor of claim 1, wherein when the coil (32) is not energized, two sides of the vibrator assembly (2) are equally spaced from two inner walls of the housing (1) along the width of the housing (1), and two sides of the iron core (31) are equally spaced from two side walls of the through hole along the width of the housing (1).

8. The linear vibration motor of claim 7, wherein along the width of the housing (1), a distance between the vibrator assembly (2) and the inner wall of the housing (1) is smaller than a distance between the iron core (31) and a side wall of the through hole.

9. The linear vibration motor of claim 8, wherein when the coil (32) is not energized, two sides of the vibrator assembly (2) are equally spaced from two inner walls of the housing (1) along the length of the housing (1), and two sides of the iron core (31) are equally spaced from two side walls of the through hole along the length of the housing (1).

10. The linear vibration motor of claim 8, wherein the housing (1) comprises a bottom plate (12) and a cover (13);
wherein the bottom plate (12) and the cover (13) enclose a receiving cavity, and the vibrator assembly (2) and the driving assembly (3) are disposed in the receiving cavity; and
a notch is defined in an edge of the cover (13) connected to the bottom plate (12), and the bottom plate (12) extends outwards from the notch to form a fixing table, and the circuit board (11) is mounted on the fixing table.

11. The linear vibration motor of claim 7, wherein when the coil (32) is not energized, two sides of the vibrator assembly (2) are equally spaced from two inner walls of the housing (1) along the length of the housing (1), and two sides of the iron core (31) are equally spaced from two side walls of the through hole along the length of the housing (1).

12. The linear vibration motor of claim 11, wherein an elastic deformation amount of each of the two elastic members (23) along the length of the housing (1) is smaller than a distance between the iron core (31) and a side wall of the through hole along the length of the housing (1).

13. The linear vibration motor of claim 7, wherein the housing (1) comprises a bottom plate (12) and a cover (13);
wherein the bottom plate (12) and the cover (13) enclose a receiving cavity, and the vibrator assembly (2) and the driving assembly (3) are disposed in the receiving cavity; and
a notch is defined in an edge of the cover (13) connected to the bottom plate (12), and the bottom plate (12) extends outwards from the notch to form a fixing table, and the circuit board (11) is mounted on the fixing table.

14. The linear vibration motor of claim 1, wherein a magnetic conductive plate (24) is further interposed between each of the two permanent magnets (22) and a side wall of the through hole that is adjacent to the respective permanent magnet (22) and that extends along the length of the housing (1).

15. The linear vibration motor of claim 1, wherein a buffer block (25) is interposed between each of two ends of the driving assembly (3) along the length of the housing (1) and a corresponding one of two side walls of the through hole along the width of the housing (1).

16. The linear vibration motor of claim 1, wherein a magnetic fluid is filled between the vibrator assembly (2) and the driving assembly (3).

17. The linear vibration motor of claim 1, wherein the housing (1) comprises a bottom plate (12) and a cover (13);
wherein the bottom plate (12) and the cover (13) enclose a receiving cavity, and the vibrator assembly (2) and the driving assembly (3) are disposed in the receiving cavity; and
a notch is defined in an edge of the cover (13) connected to the bottom plate (12), and the bottom plate (12) extends outwards from the notch to form a fixing table, and the circuit board (11) is mounted on the fixing table.

* * * * *